INVENTOR
LARRY A. WHATLEY
BY *G. C. Smith*
ATTORNEY

United States Patent Office 3,315,153
Patented Apr. 18, 1967

3,315,153
BRIDGE CIRCUIT EMPLOYING SELF-
BALANCING CONTROL MEANS
Larry A. Whatley, Loveland, Colo., assignor to Hewlett-Packard Company, Palo Alto, Calif., a corporation of California
Filed Jan. 21, 1965, Ser. No. 426,940
5 Claims. (Cl. 323—75)

This invention relates to a bridge circuit in which variable elements in the branch circuits are varied by phase-sensitive feedback circuits. A bridge circuit of this type facilitates obtaining true orthogonal null in precision component measurements and provides automatic balancing for accurate frequency selection.

It is an object of the present invention to provide a bridge circuit in which one branch circuit is adjusted in response to a phase-sensitive feedback circuit.

It is another object of the present invention to provide a bridge circuit in which pairs of branch circuits are individually adjusted by separate feedback circuits which are sensitive to phases of bridge signal that are orthogonally separated.

In accordance with the illustrated embodiment of the present invention, a signal controllable element is varied by one feedback circuit to provide a phase null and another similar element is varied by another feedback circuit to provide an amplitude null. Bridge output is utilized to provide an indication of the parameters of an element under test or of distortion frequency components present in the bridge driving signal.

Figure 1:
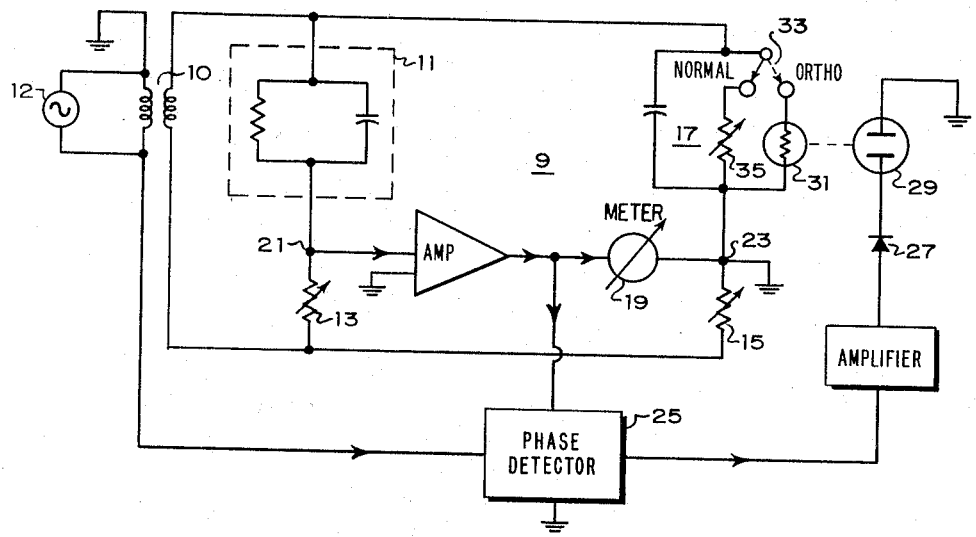
Figure 2:
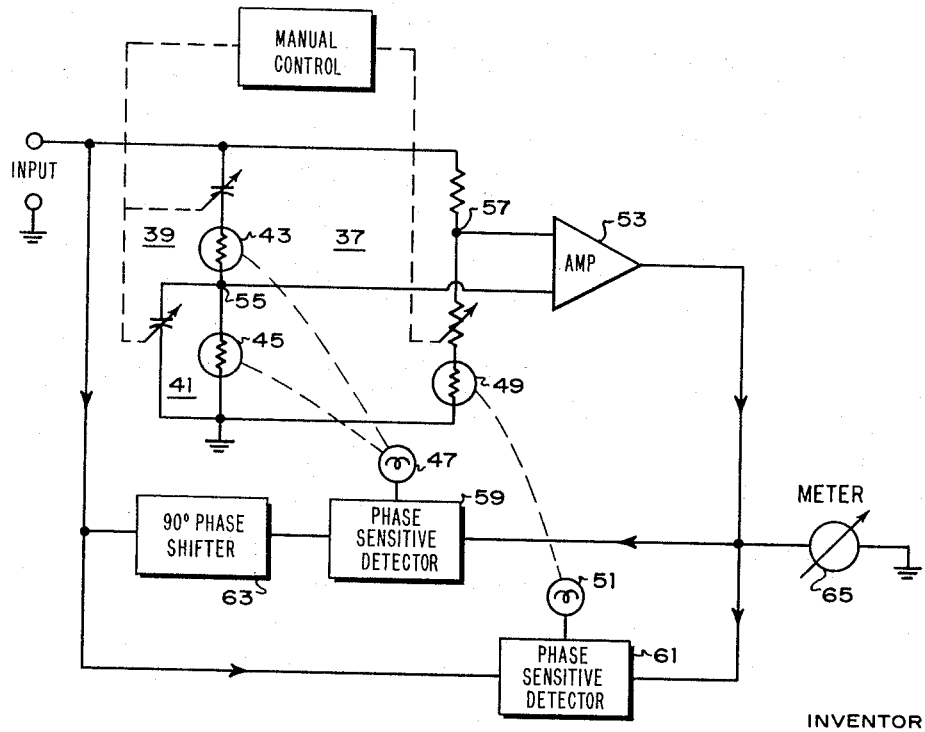

These and other objects of the present invention will be apparent from a reading of this specification and an inspection of the accompanying drawing in which:

FIGURE 1 is a schematic diagram of one embodiment of the bridge circuit of the present invention which is self-balancing at a selected frequency with an unknown impedance element connected in the bridge circuit; and FIGURE 2 is a schematic diagram of another embodiment of the present invention which is self-balancing on an unknown applied frequency.

Referring now to FIGURE 1 of the drawing, there is shown a bridge circuit 9 including an element 11 under test and resistor 13 serially connected across the secondary of transformer 10 to receive an input signal from source 12. Another branch circuit including serially-connected resistor 15 and network 17 is connected across the secondary of transformer 10 to receive the input signal. Meter 19 (or other utilization circuit) is connected to indicate an unbalance signal between nodes 21 and 23 and the phase detector 25 receives the amplified signal appearing at node 21 for comparison with the phase of another signal, typically the input signal or the signal across one of resistors 13 and 15. The output of detector 25 is amplified and applied through diode 27 to the light source 29 coupled to photoresponsive element 31 of network 17.

In operation, switch 33 of network 17 is set in the ORTHO position and calibrated resistor 15 is adjusted to provide a null. Detector 25 responds to change in relative phase angle between the signal at node 21 and a reference signal (say, the input signal, as shown) to produce an output signal which actuates light source 29. The change in the resistance of photoresponsive element 31 illuminated by light source 29 causes the relative phase angle previously mentioned to remain unchanged, ideally at zero, as resistor 15 is adjusted to produce an amplitude null. The value of resistor 15 is related to the magnitude of the complex impedance of element 11 under test by known bridge equations and the angle between the resistive and reactive components of element 11 is related to the resistance of photoresponsive element 31.

However, since element 31 cannot be readily and accurately calibrated, switch 33 is then set in the NORMAL position to insert the calibrated resistor 35 in place of the element 31 and the resistor 35 is then adjusted to produce a null. Since the amplitude adjustment by resistor 15 is the same, resistor 35 is adjusted to the same value of element 31 which previously established a phase null. The value of resistor 35 is thus related to the phase angle of the complex impedance of element 11 by known bridge equations. Of course, it will be appreciated that a detector which is responsive to amplitude difference rather than phase difference and connected between nodes 21 and 23 may be used to vary a photoresponsive element substituted for resistor 15 to maintain an amplitude null while the resistor 35 is adjusted first to establish a phase null. A calibrated resistor may then be substituted for the photoresponsive element and adjusted to re-establish an amplitude null.

In the circuit of FIGURE 2, there is shown a bridge circuit 37 including a pair of phase-shifting branch circuits 39 and 41, each of which includes a photoresponsive element 43, 45 disposed to be illuminated by light source 47, serially connected to receive an input signal. A pair of resistive branch circuits, one including photoresponsive element 49 illuminated by light source 51, are also serially connected to receive the input signal. Manual control of the frequency ranges over which the branch circuit 39 and 41 can automatically adjust may be accomplished in a known manner as by setting the value of the series capacitor in circuit 39 and the value of the parallel capacitor in circuit 41. Also, manual control of the ranges of input signal amplitudes over which the present circuit can operate may be accomplished by setting the value of the resistor connected in series with the photoresponsive element 49 to alter the signal attenuation ratio from the input to the terminal 57. Amplifier 53 is connected to receive the signals at the common connections 55, 57 of the branch circuits for driving phase-sensitive detectors 59, 61 with the amplified unbalance signal. Detector 61 also receives the input signal for producing an output which illuminates light source 51 and which is related to the amplitude of either the in-phase or the out-of-phase resultant of the two applied signals. Phase-sensitive detector 59 receives the input signal shifted 90° by the phase shifter 63 for producing an output which illuminates light source 47 and which is related to the amplitude of the 90° or 270° resultant of the two applied signals (i.e. the quadrature component of the bridge output). Because of the relative 90° phase separation between the two reference signals applied to the detectors 59, 61, the bridge automatically attains a true orthogonal null. Any tracking error in the changes of the resistances of elements 43 and 45 causes an amplitude unbalance which is compensated for by element 49. The bridge thus rejects a selected frequency component of the input signal and is unbalanced for other frequency components. The circuit of FIGURE 2 is thus useful as a distortion analyser for tuning out selected frequency components of the input signal. A meter 65 or other utilization circuit connected to receive the amplified unbalance signal thus provides an indication of the residual frequency components present in the input signal along with the selectively rejected frequency component.

I claim:
1. An electrical bridge circuit comprising:
   a pair of branch circuits serially connected to receive an applied signal;
   another pair of branch circuits serially connected to receive the applied signal;
   at least two of said branch circuits including reactive elements and at least one of said branch circuits in- cluding an element having an impedance which varies in response to a control signal applied thereto;
a source of reference signal;
a detector responsive to the continuous variation of phase relationship between the reference signal and another signal for producing a control signal;
means connected to said detector and to said element having variable impedance for altering the impedance thereof in response to the control signal from said detector; and
means connected to the common connection of one of said pairs of branch circuit for applying the signal appearing thereon to said detector as said other signal for producing said control signal.

2. An electrical bridge circuit as in claim 1 wherein the reference signal is derived from said applied signal.

3. An electrical bridge circuit comprising:
a resistive element having a resistance which varies in response to a control signal applied thereto;
a resistor;
means serially connecting said resistor and resistive element to receive an applied signal;
a pair of branch circuits, each including a reactive element and an element having an impedance which varies in response to a control signal applied thereto;
means serially connecting said pair of branch circuits to receive the applied signal;
means connected to the common connection of the resistor and resistive element and to the common connection of said pair of branch circuits for producing a bridge output signal;
a source of reference signal;
a first detector connected to receive the reference signal and said bridge output signal for producing an output related to the phase difference of signals applied thereto;
means coupling said first detector and said resistive element for altering the resistance thereof in response to the output of said first detector;
a second detector for producing an output related to the phase difference of a pair of signals applied thereto;
phase shifting means for altering the phase of a signal applied thereto by 90 electrical degrees;
means including the phase shifting means connected to said second detector for applying one of the reference signal and bridge output signal to the second detector shifted in phase and for applying the other of the last-named signals to the second detector without phase shift; and
means coupling said second detector and said elements in said branch circuits for altering the impedance of said elements in response to the output of said second detector.

4. An electrical bridge circuit as in claim 3 wherein said reference signal is derived from said applied signal.

5. An electrical bridge circuit comprising:
a first photoresponsive element having a resistance which varies in response to light incident thereupon;
a resistor;
means serially connecting said resistor and photoresponsive element to receive an applied signal;
a pair of branch circuits, one including a reactive element in series with a second photoresponsive element, the other including a reactive element in parallel with a third photoresponsive element, each of the second and third photoresponsive elements having a resistance which varies in response to light incident thereupon;
means serially connecting said pair of branch circuits to receive the applied signal;
means connected to the common connection of the resistor and first photoresponsive element and to the common connection of said pair of branch circuits for producing a bridge output signal;
first detector means including a light source and being connected to receive the applied signal and said bridge output signal for producing light output related to the amplitude of the component of signals applied to the first detector means which is capable of assuming one of in-phase and out-of-phase relationship to said applied signal;
means optically coupling the light source of said first detector means and said first photoresponsive element for altering the resistance thereof in response to the light output of said first detector means;
second detector means including a light source and being connected to receive the applied signal and said bridge output signal for producing a light output related to the amplitude of the component of signal applied to the second detector means which is in quadrature relationship to said applied signal; and
means optically coupling the light source of said second detector means and said second and third photoresponsive elements for altering the resistances thereof in response to the light output of said second detector means.

References Cited by the Examiner

UNITED STATES PATENTS

| | | |
|---|---|---|
| 2,440,200 | 4/1948 | Jofeh. |
| 3,076,885 | 2/1963 | Bentley. |
| 3,135,901 | 6/1964 | Godier. |
| 3,159,796 | 12/1964 | Van Sandwyk. |
| 3,171,032 | 2/1965 | Holt _____ 250—209 X |

JOHN F. COUCH, *Primary Examiner.*

A. D. PELLINEN, *Assistant Examiner.*